(12) United States Patent
Thomas et al.

(10) Patent No.: US 12,556,061 B2
(45) Date of Patent: Feb. 17, 2026

(54) INDUCTION MOTOR COOLING SYSTEM

(71) Applicant: ENTUPLE E-MOBILITY PRIVATE LIMITED, Bangalore (IN)

(72) Inventors: Tijo Thomas, Trivandrum (IN); Deshmukh Laxman Vitthalrao, Parbhani (IN)

(73) Assignee: ENTUPLE E-MOBILITY PRIVATE LIMITED (IN)

( * ) Notice: Subject to any disclaimer, the term of this patent is extended or adjusted under 35 U.S.C. 154(b) by 152 days.

(21) Appl. No.: 18/259,281

(22) PCT Filed: Dec. 24, 2021

(86) PCT No.: PCT/IB2021/062296
§ 371 (c)(1),
(2) Date: Jun. 26, 2023

(87) PCT Pub. No.: WO2022/137210
PCT Pub. Date: Jun. 30, 2022

(65) Prior Publication Data
US 2024/0313609 A1  Sep. 19, 2024

(30) Foreign Application Priority Data
Dec. 24, 2020  (IN) .............................. 202041056386

(51) Int. Cl.
*H02K 5/20* (2006.01)
(52) U.S. Cl.
CPC ............. *H02K 5/203* (2021.01); *H02K 5/207* (2021.01)

(58) Field of Classification Search
CPC ............ H02K 5/18; H02K 5/20; H02K 5/203; H02K 5/00; H02K 5/207; H02K 9/00;
(Continued)

(56) References Cited

U.S. PATENT DOCUMENTS 9,768,669 B2   9/2017  Huber
10,177,630 B2  1/2019  Luise et al.
(Continued)

FOREIGN PATENT DOCUMENTS

CN          107086713 A    8/2017

*Primary Examiner* — Alexander A Singh
*Assistant Examiner* — Charlie Frank Mann, Jr.
(74) *Attorney, Agent, or Firm* — Jason C. Cameron

(57) ABSTRACT

An induction motor cooling system is disclosed. The induction motor cooling system comprises a plurality of interconnected cooling channels and a plurality of air ducts characterized between inner circumference and outer circumference of the stator frame. The plurality of interconnected cooling channels is designed in a pre-designed meandering fashion to envelop the stator frame. And similarly, each of the plurality of air ducts of pre-defined dimension is axially positioned in equidistance spread to envelop the stator frame. Cooling channels enable flow of coolant liquid to dissipate heat produced by the stator coils. Air ducts helps in cooling the stator coil temperature and the rotor temperature by inflow and outflow of air. Air entry and exit to the plurality of air ducts is enabled by a set of inflow air openings and a set of outflow air openings fabricated on the inner circumference of the stator frame.

5 Claims, 13 Drawing Sheets

(58) Field of Classification Search
CPC .. H02K 9/02; H02K 9/04; H02K 9/08; H02K 9/16; H02K 9/197
USPC .......................................................... 310/54
See application file for complete search history.

(56) References Cited

U.S. PATENT DOCUMENTS

| | | | |
|---|---|---|---|
| 2013/0257197 A1* | 10/2013 | Buttner | H02K 1/20 310/54 |
| 2015/0097450 A1 | 4/2015 | Xu et al. | |
| 2018/0123430 A1 | 5/2018 | Wettlaufer et al. | |
| 2018/0269743 A1* | 9/2018 | Büttner | F16J 15/3404 |

* cited by examiner

INDUCTION MOTOR COOLING SYSTEM

EARLIEST PRIORITY DATE

This application claims priority from a complete patent application filed in India having patent application No. 202041056386, filed on Dec. 24, 2020, and titled "INDUCTION MOTOR COOLING SYSTEM" and PCT Application bearing number "PCT/IB2021/062296" filed on Dec. 24, 2021, and titled INDUCTION MOTOR COOLING SYSTEM".

FIELD OF INVENTION

Embodiments of a present disclosure relates to an induction machine, and more particularly to an induction motor cooling system.

BACKGROUND

An induction motor generally comprises a stator which generates a revolving magnetic field inside a cavity and a rotor which is rotatably arranged inside the cavity of the stator. The rotor rotates by interaction with the magnetic field generated by the stator.

To get maximum output power from the induction motor, a machine designer must reduce the losses during operation of a motor. The objective is to keep temperature of the induction motor within a permitted range to achieve maximum efficiency, longevity and reliability. Therefore, the designer must specifically design to provide means of cooling the motor and its components such as stator and rotor.

In conventional approach, a stator core is pumped with coolant axially through designed channels. Such direct cooling method enables fast cooling of stator coils only and will have no effect on rotor temperature. Simultaneously, a cooling mechanism have to be implemented for the rotor to keep the temperature within limits.

Another issue that the conventional approach faces is the non-uniform cooling of the components. Such as, during operation certain regions of the stator gets hotter as compared to the other regions due to imperfect or varied cooling. Therefore, the cooling system needs to be designed and integrated in such a way that the cooling features encompasses whole stator and rotor from every possible end and provide uniform cooling.

Further, the implementation of cooling means in the motor also ends up making it bulky and costly in fabrication. Hence, a specific compactly designed cooling system is needed, that enables cooling of the stator and rotor.

Hence, there is a need for an improved induction motor cooling system and a method of operation of the same and therefore address the aforementioned issues.

BRIEF DESCRIPTION

In accordance with one embodiment of the disclosure, an induction motor cooling system is disclosed. The induction motor cooling system comprises a plurality of interconnected cooling channels characterized between an inner circumference and an outer circumference of the stator frame. The plurality of interconnected cooling channels is fabricated in a pre-designed meandering fashion to envelop the stator frame.

The plurality of interconnected cooling channels enables flow of a coolant liquid to dissipate heat produced by the stator coils. The plurality of interconnected cooling channels is characterized on the outer circumference by a coolant liquid inlet valve and a coolant liquid outlet valve.

The induction motor cooling system also comprises a plurality of air ducts characterised between the inner circumference and the outer circumference of the stator frame. Air entry to the plurality of air ducts is enabled by a set of inflow air openings fabricated on the inner circumference of the stator frame first axial end. Simultaneously, air exit from the plurality of air ducts is enabled by a set of outflow air openings fabricated on the inner circumference of the stator frame second axial end.

Each of the plurality of air ducts of pre-defined dimension is axially positioned in equidistance spread to envelop the stator frame. The plurality of air ducts is fabricated to cool the stator overhang temperature and the rotor temperature by inflow and outflow of air.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
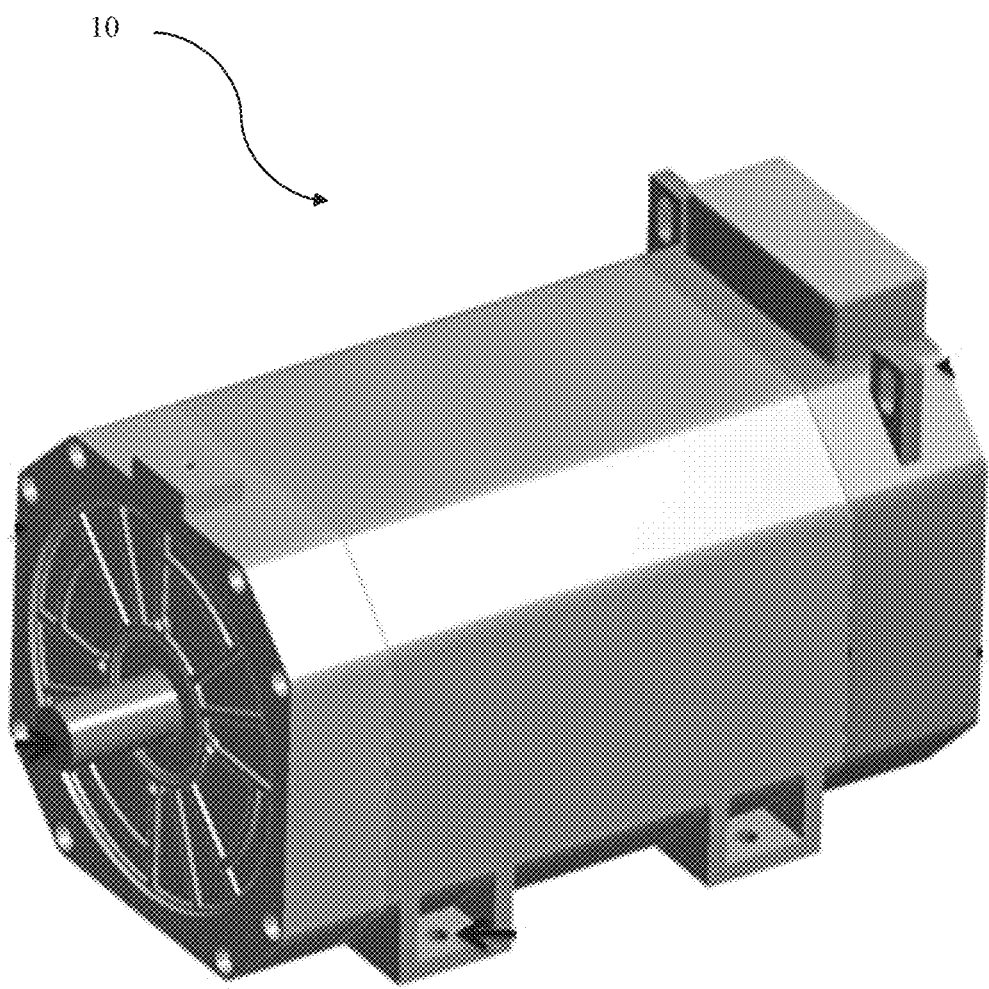
FIG. 1 is a schematic representation of an induction motor in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to an induction motor cooling system. The induction motor cooling system comprises a plurality of interconnected cooling channels and a plurality of air ducts characterized between inner circumference and outer circumference of the stator frame.

The plurality of interconnected cooling channels is designed in a pre-designed meandering fashion to envelop the stator frame. And similarly, each of the plurality of air ducts of pre-defined dimension is axially positioned in equidistance spread to envelop the stator frame. Cooling channels enable flow of coolant liquid to dissipate heat produced by the stator coils. Air ducts helps in cooling the stator overhangs and the rotor by inflow and outflow of air. Air entry and exit to the plurality of air ducts is enabled by a set of inflow air openings and a set of outflow air openings fabricated on the inner circumference of the stator frame.

FIG. 1 is a schematic representation of an induction motor 10 in accordance with an embodiment of the present disclosure. Any induction motor 10 is basically divided into two essential components, that is a stator and a rotor. The induction motor 10 works on the principle of electromagnetic induction. In induction motor 10 operation, electric current in the rotor needed to produce torque is obtained via electromagnetic induction from the rotating magnetic field of the stator winding. During the operation of the induction motor 10, the induction motor encounters heat generated losses such as iron losses, stator copper losses and rotor losses. Such losses affect the efficiency and performance of the induction motor.

Figure 2:
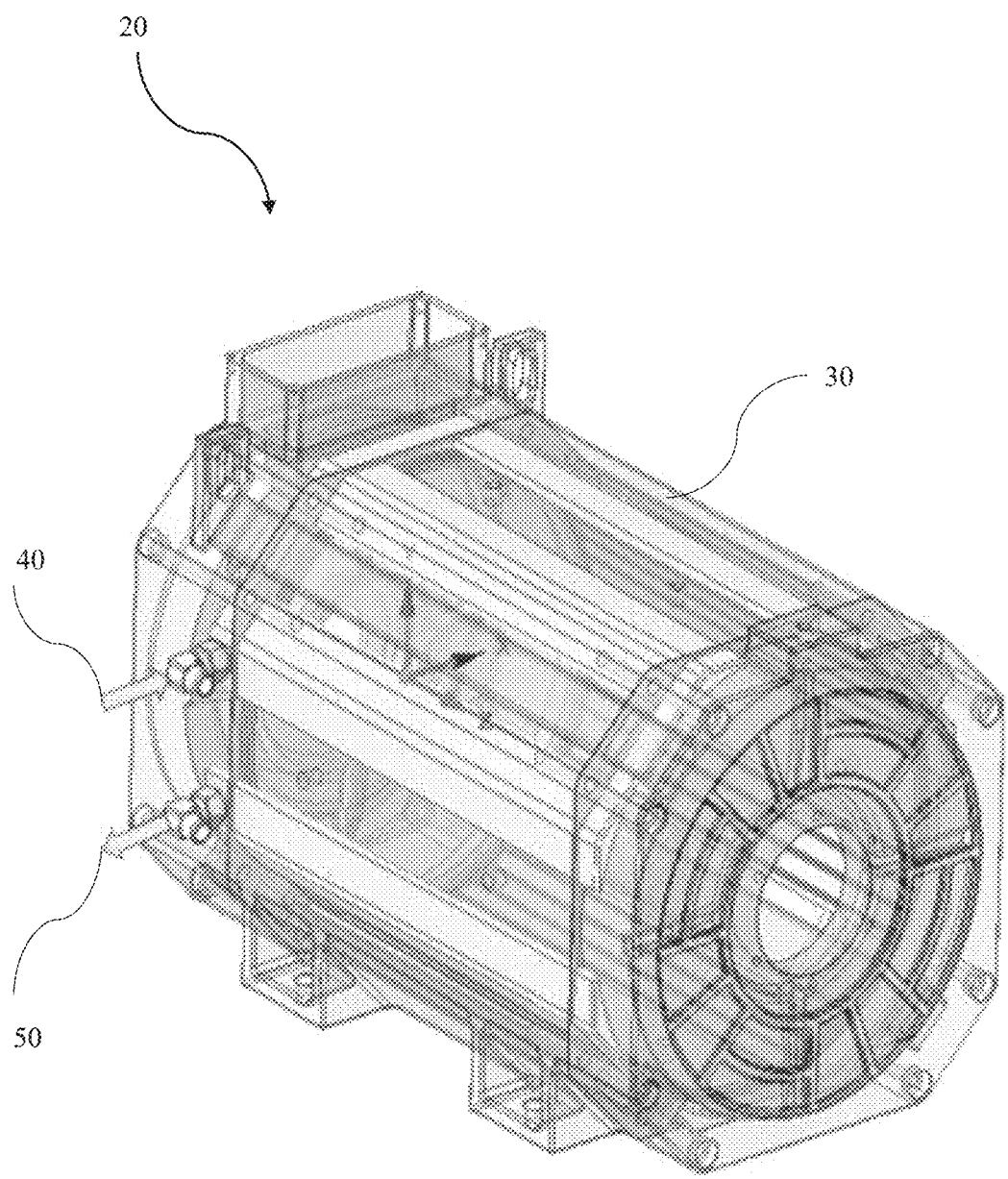
FIG. 2 is a schematic representation of an induction motor cooling system fabricated over stator frame in accordance with an embodiment of the present disclosure.

FIG. 2 is a schematic representation of an induction motor cooling system fabricated over stator frame 30 in accordance with an embodiment of the present disclosure. A stator frame 30 is characterized with a plurality of interconnected cooling channels and a plurality of air ducts between inner circumference and outer circumference. Irregular octagon shape of the stator enables fitting of the cooling channels and air ducts with minimal volume wastage.

The plurality of interconnected cooling channels is characterized on the outer circumference by a coolant liquid inlet valve 40 and a coolant liquid outlet valve 50. The induction motor 10 is enveloped all around with cooling channels and air ducts.

Figure 3:
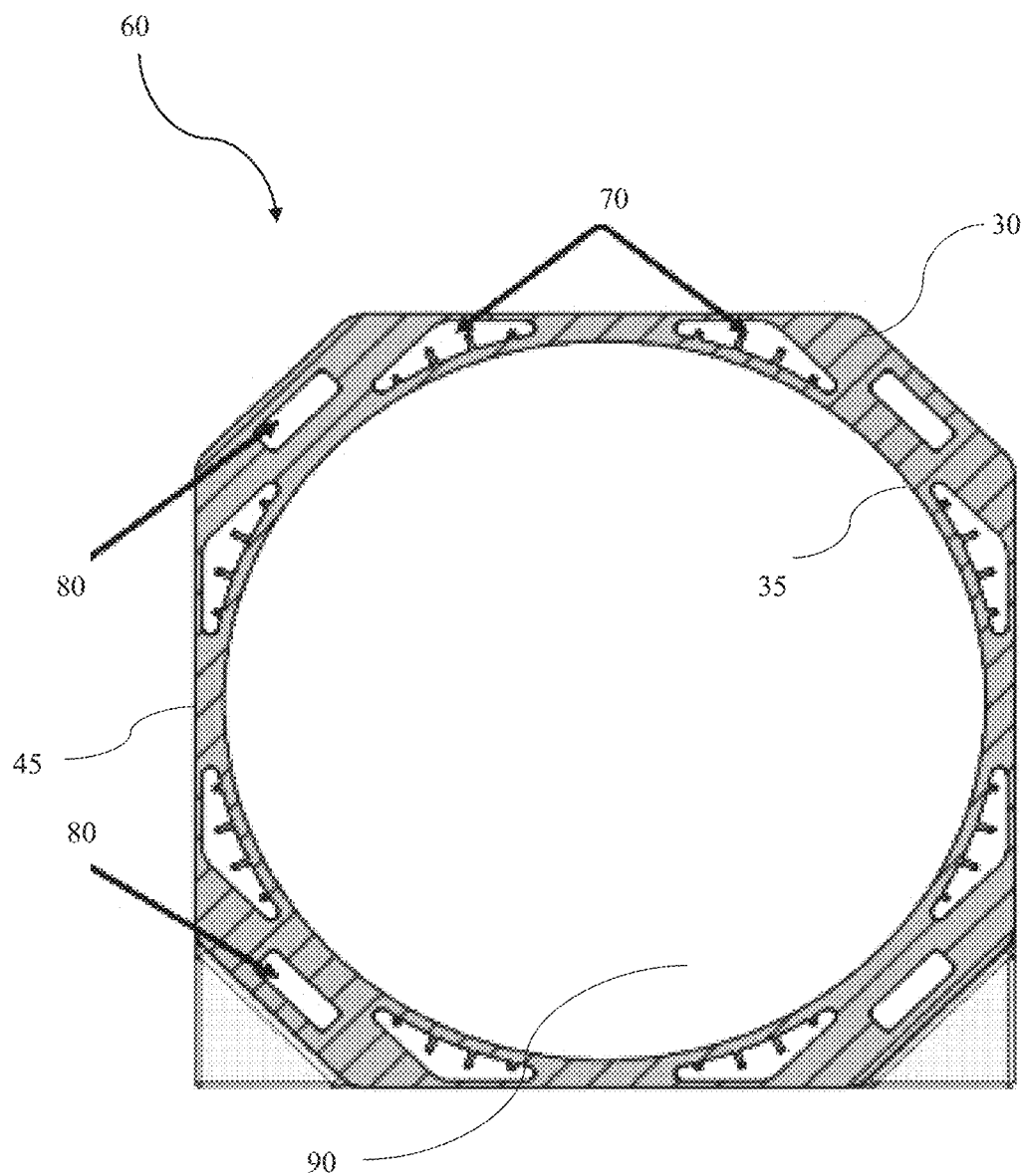
FIG. 3 is a schematic sectional representation of a plurality of interconnected cooling channels and a plurality of air ducts of FIG. 1 in accordance with an embodiment of the present disclosure.

FIG. 3 is a horizontal cross-sectional representation of a plurality of interconnected cooling channels and a plurality of air ducts 60 of FIG. 1 in accordance with an embodiment of the present disclosure. Plurality of interconnected cooling channels 70 and a plurality of air ducts 80 are fabricated between inner circumference 35 of the stator frame 30 and outer circumference 45 of the stator frame 30. In one specific embodiment, the air ducts 80 are positioned at four specific corners of the stator frame 30. In such specific embodiment, the cooling channels 70 as shown is positioned on each side of the stator frame 30. Here, the each of the cooling channels 70 are interconnected to form one enveloping cooling channel.

Figure 4:
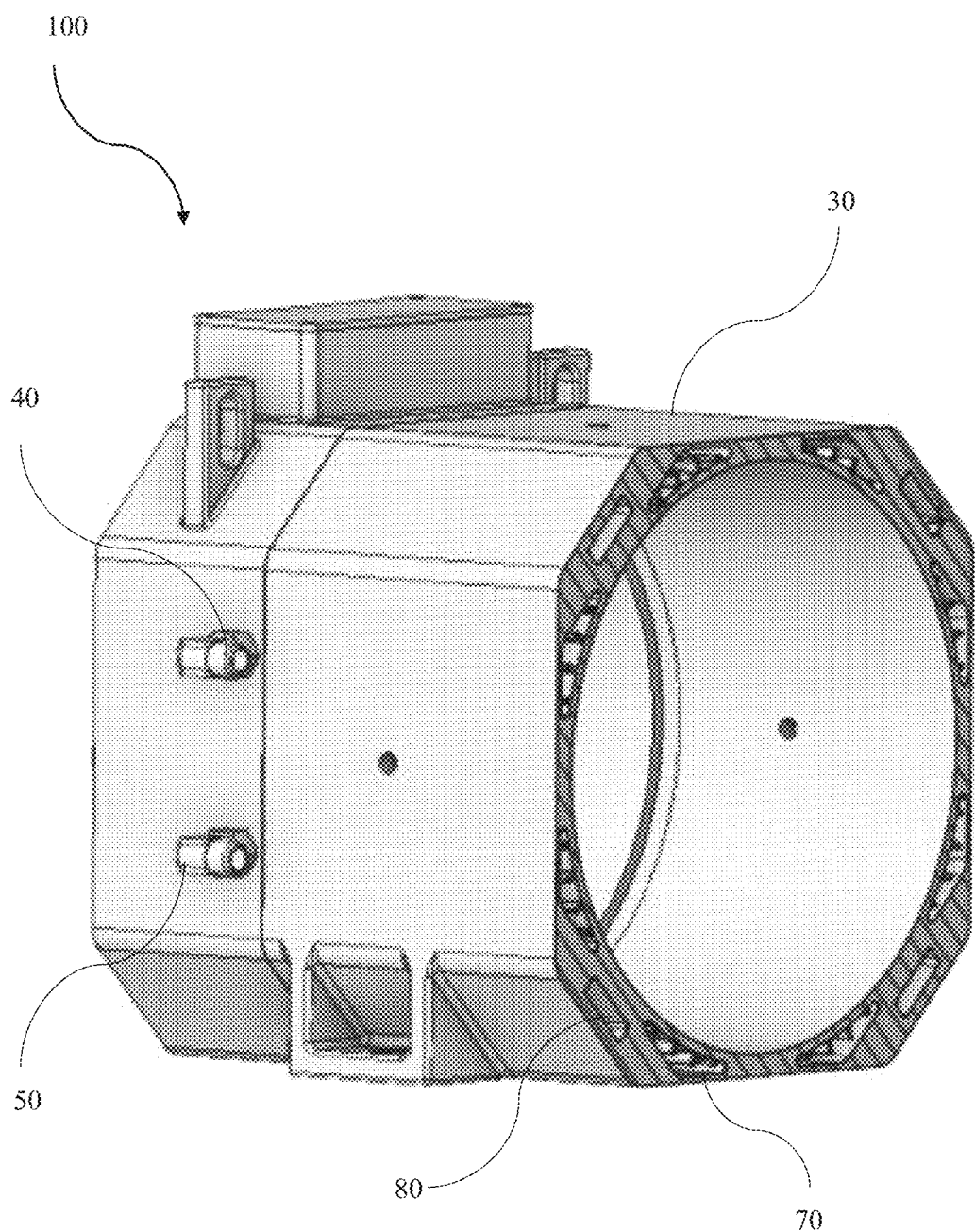
FIG. 4 is a schematic side representation of a plurality of interconnected cooling channels and a plurality of air ducts fabricated between inner circumference and outer circumference of the stator frame of FIG. 1 in accordance with an embodiment of the present disclosure.

Dimensions of each of the air ducts as well as the cooling channels is in accordance with the dimension of the stator frame. FIG. 4 is a cross sectional side representation of a plurality of interconnected cooling channels and a plurality of air ducts fabricated between inner circumference 35 and outer circumference 45 of the stator frame 100 of FIG. 1 in accordance with an embodiment of the present disclosure.

Figure 5:
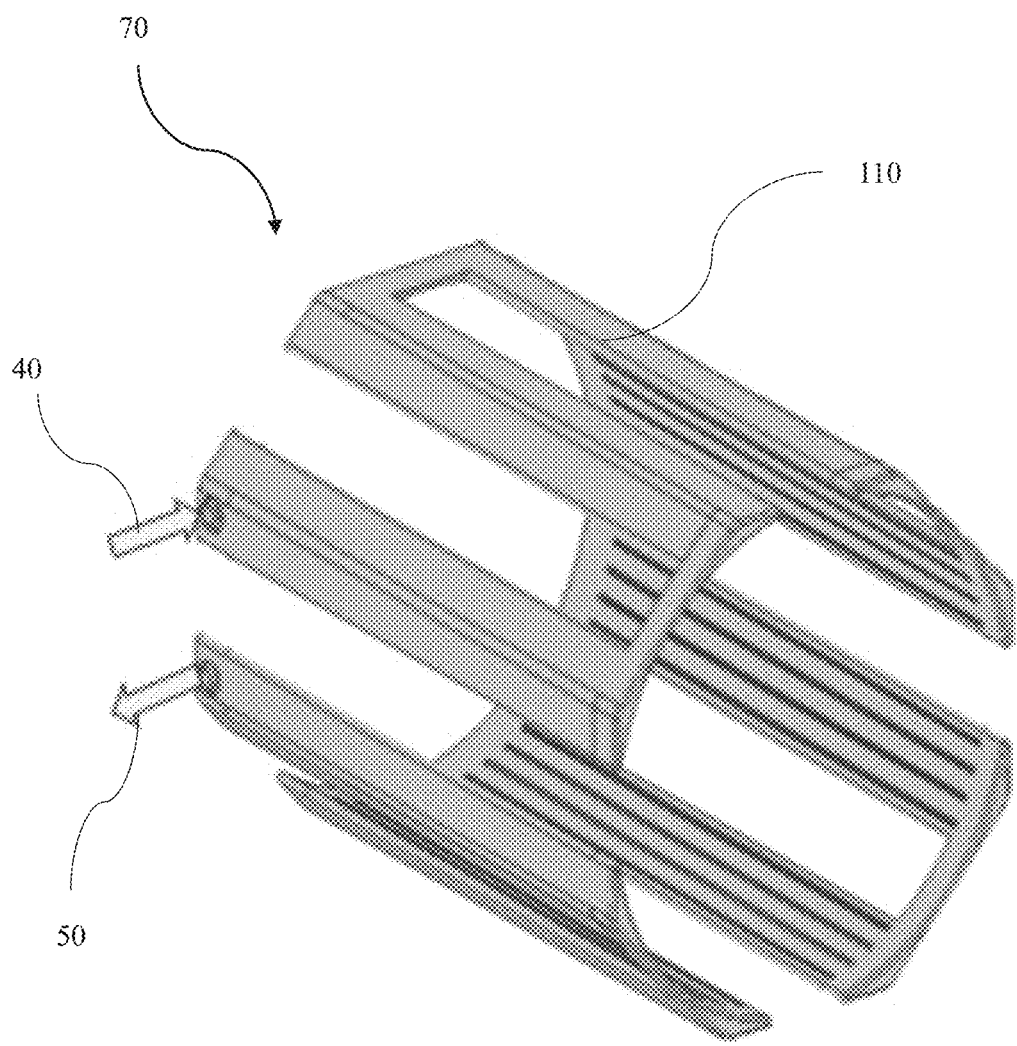
FIG. 5 is a schematic representation of plurality of interconnected cooling channels of FIG. 2 in accordance with an embodiment of the present disclosure.

FIG. 5 is a schematic representation of plurality of interconnected cooling channels 70 of FIG. 2 in accordance with an embodiment of the present disclosure. The plurality of interconnected cooling channels 70 is fabricated in a pre-designed meandering fashion 110 to envelop the stator frame 30. In one specific embodiment, the pre-designed meandering fashion fabrication 110 of the plurality of interconnected cooling channels 70 comprises helical loop fashion fabrication of the plurality of interconnected cooling channels 70 enveloping the stator frame 30. It is pertinent to note that the helical loop fashion design enables covering more area over stator frame 30 to enable more cooling.

The plurality of interconnected cooling channels 70 enables flow of coolant liquid to dissipate heat produced by the stator coils. The coolant liquid comprises water and glycol in a ratio of 1:1. Here, glycol is basically used to maintain temperature consistency. In such embodiment, the plurality of interconnected cooling channels 70 is characterized on the outer circumference by a coolant liquid inlet valve 40 and a coolant liquid outlet valve 50. A coolant liquid inlet valve 40 is configured to allow inlet of the coolant liquid and a coolant liquid outlet valve 50 is configured to enable discharge of the coolant liquid.

The plurality of interconnected cooling channels 70 is designed in a pre-defined shape with one or more vertical protrusions on a base side. In such embodiment, the protrusions are configured to evenly spread the coolant liquid inside the plurality of interconnected cooling channels. It is pertinent to note that a height of each of the one or more vertical protrusions increases with distance from the base side corners. In one embodiment, the one or more vertical protrusions may be fabricated in a rectangular shape structure.

Figure 6:
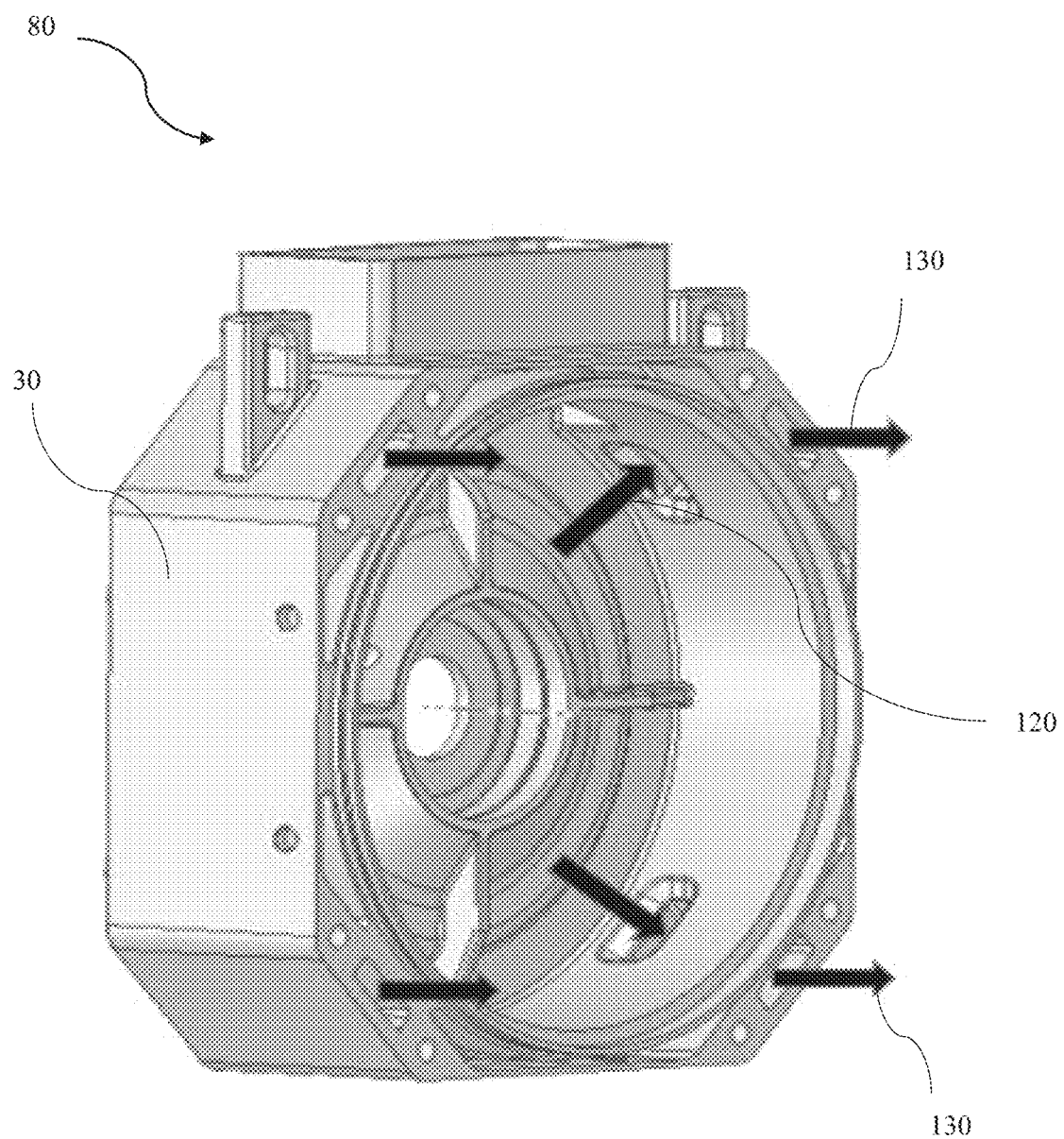
FIG. 6 is a left side horizontal cross section representation of plurality of air ducts along with a set of inflow air openings of FIG. 2 in accordance with an embodiment of the present disclosure.
Figure 7:
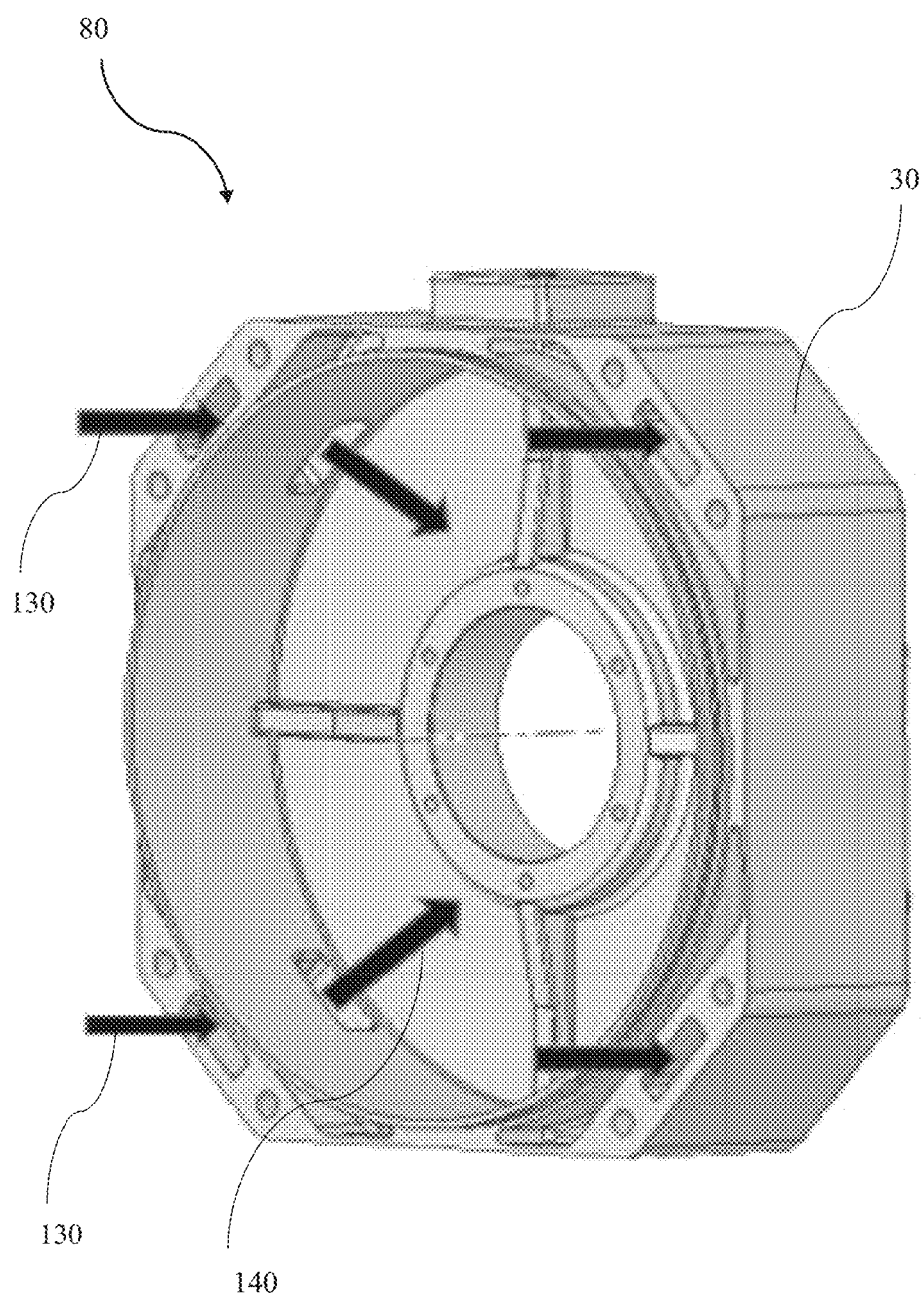
FIG. 7 is a right side horizontal cross section representation of plurality of air ducts along with a set of outflow air openings of FIG. 2 in accordance with an embodiment of the present disclosure.

FIG. 6 is a left side horizontal cross section representation of plurality of air ducts 80 along with a set of inflow air openings of FIG. 2 in accordance with an embodiment of the present disclosure. FIG. 7 is a right side horizontal cross section representation of plurality of air ducts 80 along with a set of outflow air openings of FIG. 2 in accordance with an embodiment of the present disclosure.

Each of the plurality of air ducts 80 of pre-defined dimension is axially overlayed in equidistance over the stator frame 30 starting from one axial end of the induction motor 10 to another axial end of the induction motor 10. In one specific embodiment, the plurality of air ducts 80 is spread to envelop the said stator frame 30 horizontally. In such embodiment, the plurality of air ducts 80 is fabricated to cool the stator coil temperature and the rotor temperature by inflow and outflow of air. Air enters the plurality of air ducts 80 via set of inflow air openings 120 and exits the plurality of air ducts 80 via a set of outflow air openings 140.

For cooling, air entry to the plurality of air ducts 80 is enabled by a set of inflow air openings 120 fabricated on the inner circumference 35 of the stator frame 30 first axial end. As the air traverses 130 through the air duct 180, the stator coil temperature and the rotor temperature decrease gradually. The flowing air gets cooled as it passes on the heat to the adjoining flowing coolant liquid through the interconnected coolant channels 70. After axially crossing 130 the air duct, air exit is enabled by a set of outflow air openings 140 fabricated on the inner circumference 35 of the stator frame second axial end.

For circulation of the air, the air exit from the set of outflow air openings 140 is circulated back into the plurality of air ducts 80 by the set of inflow air openings 120 via a plurality of rotor air vents. In such embodiment, the rotor is fabricated with rotor air vents of predefined dimensions. A specially designed fan, coupled at the end of rotor stack, is configured to suck the hot cool air passing from the rotor vents and push it inside the plurality of air ducts present in the stator frame 30 for heat dissipation.

Figure 8:
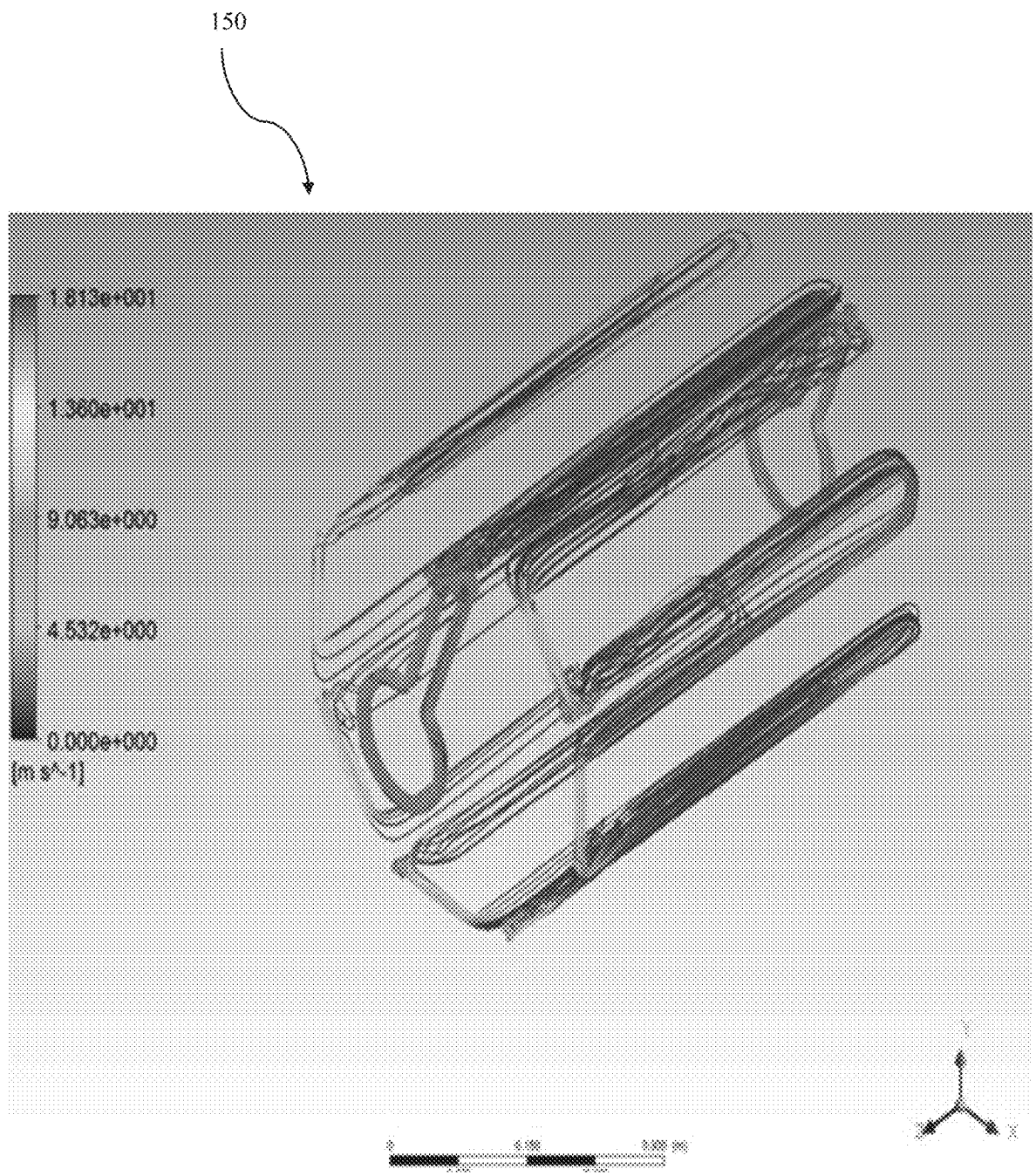
FIG. 8 is a schematic representation coolant streamline velocity corresponding to the plurality of interconnected cooling channels in accordance with an embodiment of the present disclosure.

The present invention was tested to identify coolant streamline velocity in the design. FIG. 8 is a schematic representation coolant streamline velocity 150 corresponding to the plurality of interconnected cooling channels in accordance with an embodiment of the present disclosure. In the showcased representation, the streamline velocity of the coolant liquid is in the range of 0.000e m/s to 4.532e m/s.

Figure 9:
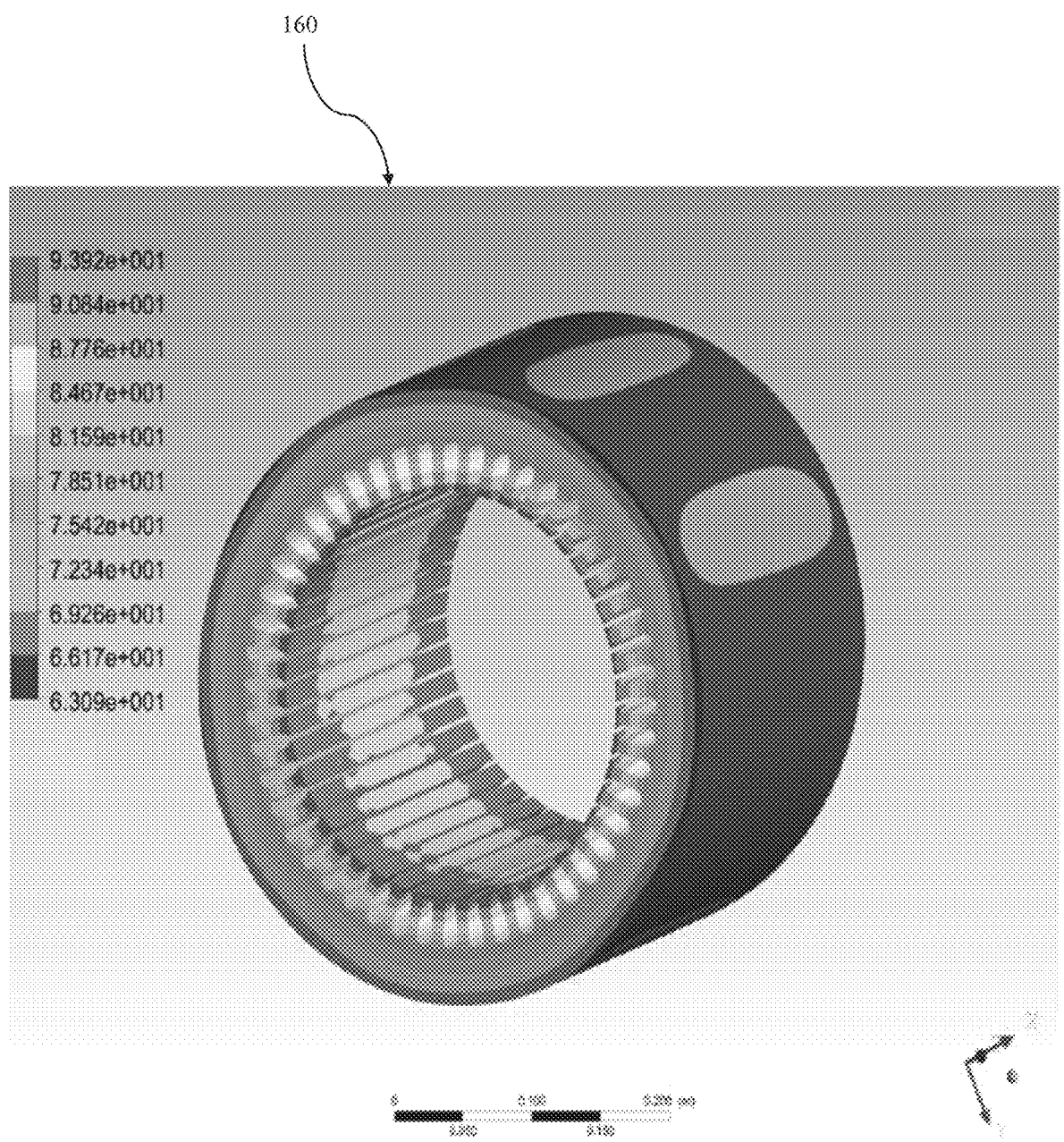
FIG. 9 is a schematic representation showcasing stator temperature gradient in accordance with an embodiment of the present disclosure.

Furthermore, the present invention was tested to identify stator temperature in the design. FIG. 9 is a schematic representation showcasing stator temperature 160 gradient in accordance with an embodiment of the present disclosure. In the showcased representation, the temperature gradient is in the range of 6.309e+001° C. to 9.392e+001° C. It was found that outer periphery of the stator experiences low temperature gradient, while inner periphery of the stator experiences high temperature gradient.

Figure 10:
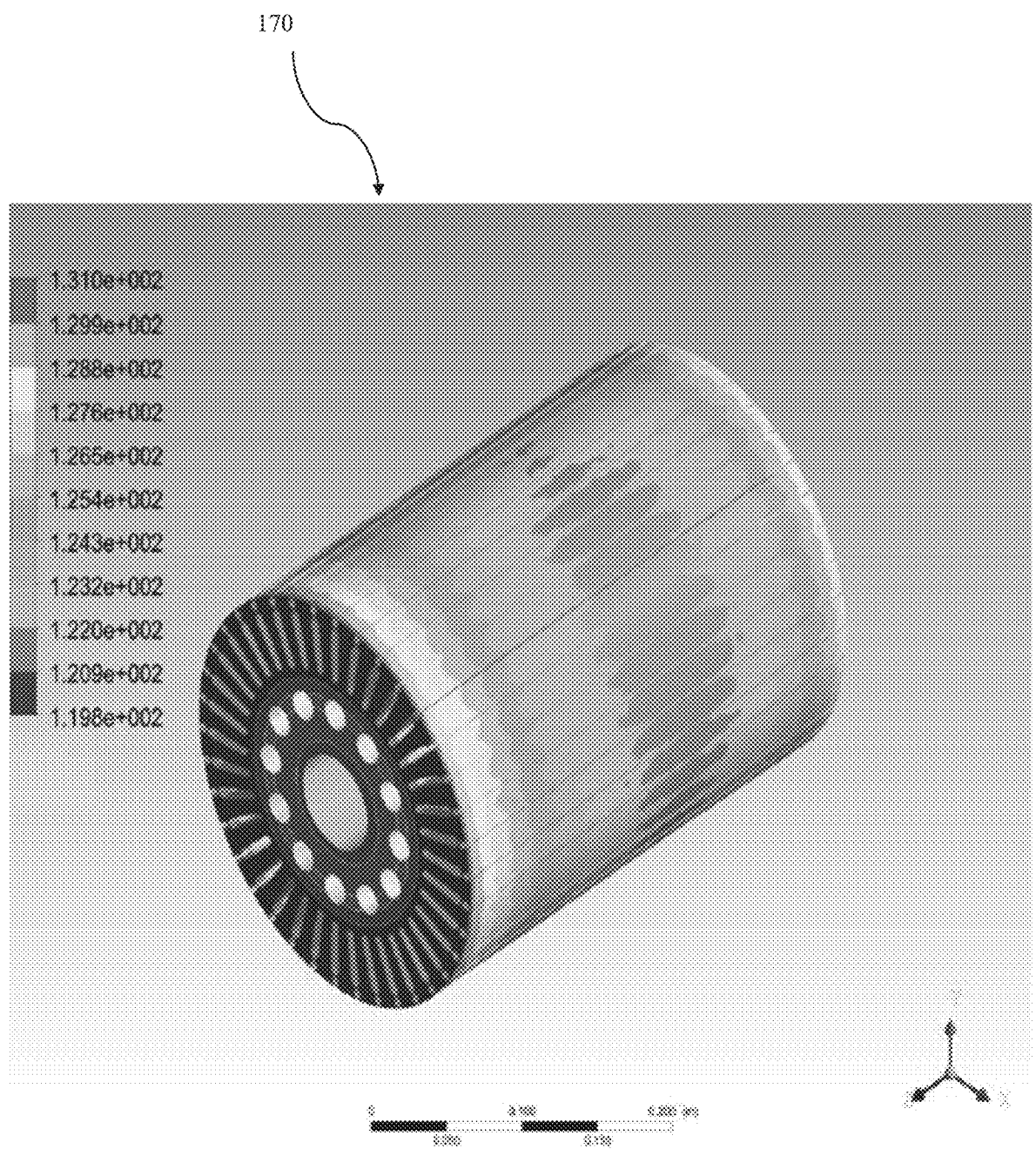
FIG. 10 is a schematic representation showcasing rotor temperature gradient in accordance with an embodiment of the present disclosure.

The present invention was tested to identify rotor temperature in the design. FIG. 10 is a schematic representation showcasing rotor temperature gradient 170 in accordance with an embodiment of the present disclosure. In the showcased representation, the temperature gradient is in the range of 1.198e+002° C. to 1.310e+002° C. It was found that outer axial end of the rotor experiences high temperature gradient.

Figure 11:
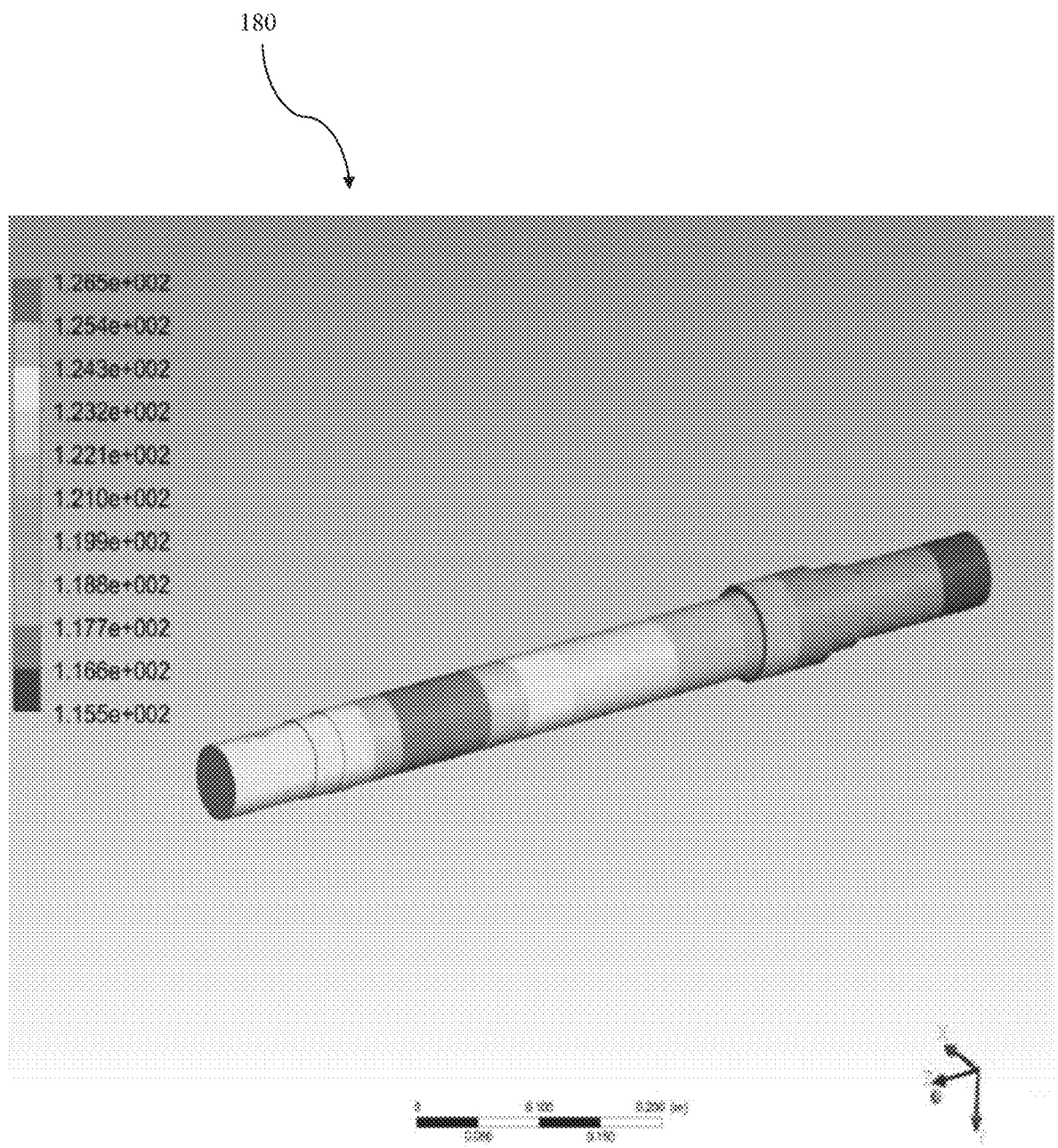
FIG. 11 is a schematic representation showcasing shaft temperature gradient in accordance with an embodiment of the present disclosure.

Additionally, the present invention was tested to identify shaft temperature in the design. FIG. 11 is a schematic representation showcasing shaft temperature gradient 180 in accordance with an embodiment of the present disclosure. In the showcased representation, the temperature gradient is in the range of 1.155e+002° C. to 1.265e+002° C.

Figure 12:
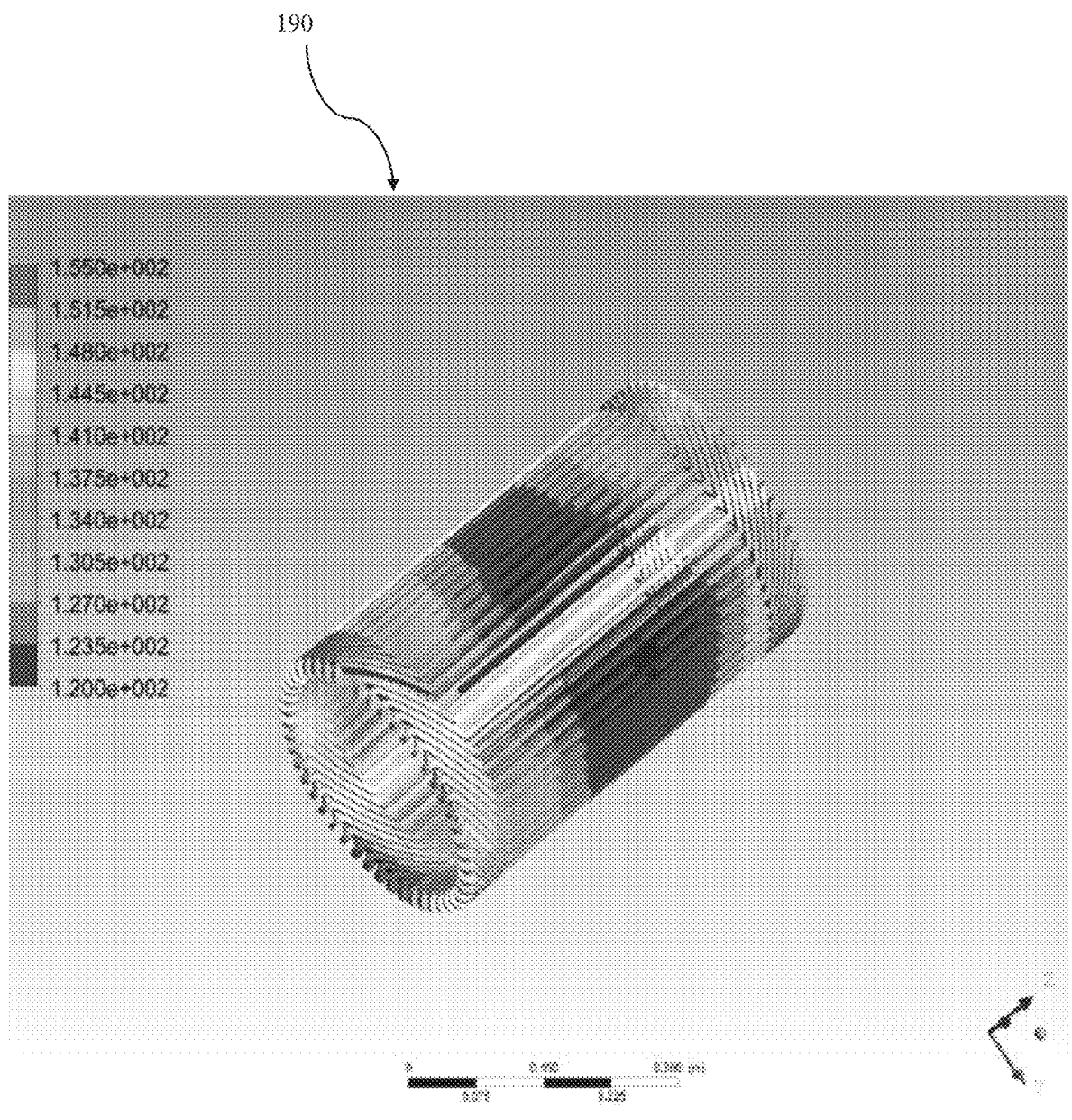
FIG. 12 is a schematic representation showcasing stator coil temperature gradient in accordance with an embodiment of the present disclosure.

The present invention was tested to identify stator coil temperature in the design. FIG. 12 is a schematic representation showcasing stator coil temperature gradient 190 in accordance with an embodiment of the present disclosure. In the showcased representation, the temperature gradient is in the range of 1.200e+002° C. to 1.550e+002° C. It was found that inner region of the placed stator coil experiences low temperature gradient.

Figure 13:
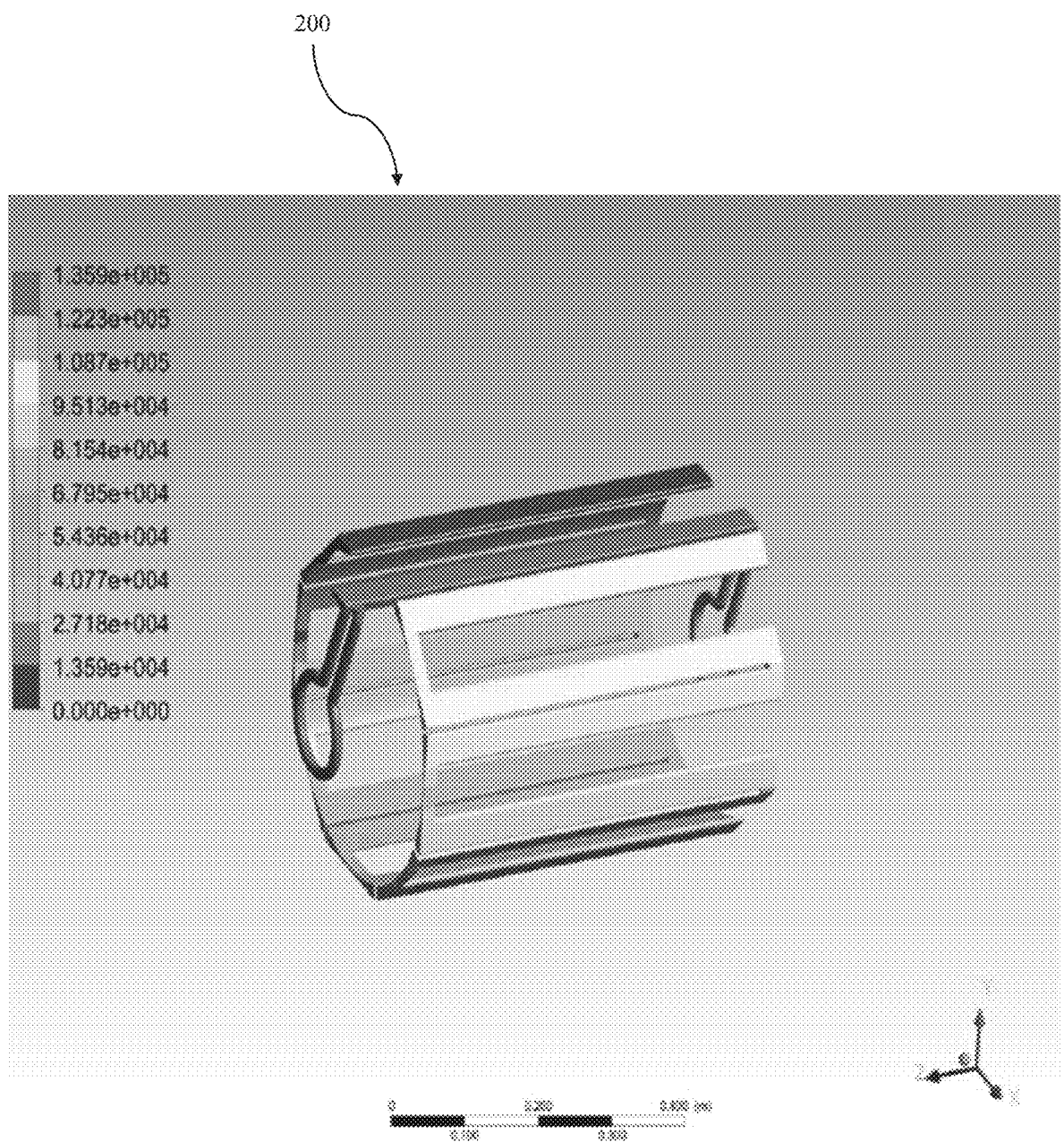
FIG. 13 is a schematic representation showing pressure contour for the coolant in accordance with an embodiment of the present disclosure.

The present invention was tested to identify pressure contour for coolant in the design. FIG. 13 is a schematic representation showing pressure contour for the coolant 200 in accordance with an embodiment of the present disclosure. In the showcased representation, the pressure is in the range of 0.00e+000 Pa to 1.359e+005 Pa.

Present disclosure provides a specifically designed cooling system to help in reducing temperature of the stator and rotor. The design uses specifically laid coolant channels and air ducts to cool the motor. The coolant channels are laid in meandering fashion to cover maximum area over the stator frame. The air ducts enable passage of air to traverse through the stator frame and exchange heat with the coolant channels as the air passes through the rotor.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:
1. An induction motor cooling system, comprising:
a rotor;
a stator comprising a stator frame fabricated with:
a plurality of interconnected cooling channels between an inner circumference and an outer circumference, wherein the plurality of interconnected cooling channels is fabricated in a pre-designed meandering fashion to envelop the stator frame and enable flow of coolant liquid to dissipate heat produced by stator coils, wherein the pre-designed meandering fashion fabrication of the plurality of interconnected cooling channels comprises helical loop fashion fabrication of the plurality of interconnected cooling channels enveloping the stator frame;

wherein the plurality of interconnected cooling channels is characterized on the outer circumference by a coolant liquid inlet valve and a coolant liquid outlet valve;

wherein the plurality of interconnected cooling channels is designed in a pre-defined shape with one or more vertical protrusions on a base side, wherein a height of each of the one or more vertical protrusions increases with distance from the base side corners and is configured to evenly spread the coolant liquid inside the plurality of interconnected cooling channels, and a plurality of air ducts between the inner circumference and the outer circumference, wherein air entry to the plurality of air ducts is enabled by a set of inflow air openings fabricated on the inner circumference of the stator frame first axial end, wherein air exit from the plurality of air ducts is enabled by a set of outflow air openings fabricated on the inner circumference of the stator frame second axial end, wherein the air exit from the set of outflow air openings is circulated back into the plurality of air ducts to the set of inflow air openings via a plurality of rotor air vents, wherein each of the plurality of air ducts of pre-defined dimension is axially positioned in equidistance spread to envelop the stator frame and fabricated to cool the stator coil temperature and rotor temperature by inflow and outflow of air.

2. The induction motor cooling system as claimed in claim 1, wherein the coolant liquid comprises water and glycol in a ratio of 1:1.

3. The induction motor cooling system as claimed in claim 1, wherein a coolant liquid inlet valve is configured to allow inlet of the coolant liquid and a coolant liquid outlet valve is configured to enable discharge of the coolant liquid.

4. The induction motor cooling system as claimed in claim 1, wherein the pre-defined dimension of the plurality of air ducts is proportional to the dimensions of the stator and the rotor.

5. The induction motor cooling system as claimed in claim 1, wherein the dimensions of the plurality of interconnected cooling channels is proportional to the dimensions of the stator and the rotor.

* * * * *